United States Patent Office 3,517,012
Patented June 23, 1970

---

3,517,012
1,4-DIAZA-BICYCLO-(4,4,0)BENZO-(1,2,h)-DECANE COMPOUNDS
Gilbert Regnier, Sceaux, Roger Canevari, La Hay-les-Roses, and Jean-Claude Le Douarec, Suresnes, France, assignors to Societe en nom Collectif Science Union et Cie, Societe Francaise de Recherche Medicale, a French society
No Drawing. Filed May 17, 1967, Ser. No. 639,053
Claims priority, application Great Britain, May 25, 1966, 23,367/66
Int. Cl. C07d 57/22
U.S. Cl. 260—268                   7 Claims

ABSTRACT OF THE DISCLOSURE 1,4-diazabicyclo (4,4,0) benzo (1,2,h) decane compounds substituted, in position 4, either by:

(1)      —Y—Ar wherein:

Y is a linear or branched polymethylene chain, having 1 to 4 carbon atoms, inclusive, optionally containing an ethylenic double bond; and Ar is halophenyl, trifluoromethylphenyl, lower-alkylphenyl, hydroxyphenyl, lower-alkoxyphenyl, methylene- or ethylene-dioxyphenyl, and can be phenyl when Y is other than $CH_2$, or by (2)
$$-Z-\underset{R_2}{\overset{R_1}{\underset{|}{\overset{|}{C}}}}-R_3$$

wherein:

Z is a linear or branched polymethylene chain, having 0 to 4 carbon atoms, inclusive;
$R_1$ is hydrogen, hydroxy or phenyl,
$R_2$ is phenyl or cyclohexyl or lower-alkylphenyl, and
$R_3$ is phenyl, halophenyl, trifluoromethylphenyl, lower-alkylphenyl or lower-alkoxyphenyl.

These compounds possess parasympathicolytic, anticholinergic, spasmolytic and antiserotonin properties.

---

The present invention provides 1,4-diazabicyclo (4,4,0)-benzo (1,2,h) decane compounds of the general Formula I:

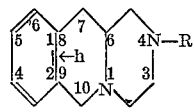

(I)

in which R represents either
(1) a group of the general Formula II

—Y—Ar      (II)

in which
(a) Y represents a linear polymethylene chain $(CH_2)_n$, in which $n$ is an integer from 1 to 4 inclusive, which may contain an ethylenic double bond, or Y represents a branched polymethylene chain containing 1 to 4 carbon atoms inclusive.

(b) Ar represents a phenyl radical substituted by one or more halogen atoms or trifluoromethyl groups, alkyl radicals containing up to 5 carbon atoms inclusive, hydroxy groups, alkoxy groups containing up to 5 carbon atoms inclusive, or alkylenedioxy groups $$-O-(CH_2)_m-O-$$

where $m$ is the integer 1 or 2, and can also represent an unsubstituted phenyl radical except when $n=1$, or
(2) a group of the general Formula III

(III)

in which
(a) Z represents a linear polymethylene chain $$-(CH_2)_p-$$

in which $p$ is an integer from 0 to 4 inclusive, or Z represents a branched polymethylene chain containing up to 4 carbon atoms inclusive (b) $R_1$ represents hydrogen, or hydroxy, or a phenyl radical (c) $R_2$ represents a phenyl, lower-alkylphenyl, or cyclohexyl radical (d) $R_3$ represents a phenyl radical which is unsubstituted, or substituted by one or more halogen atoms, trifluoromethyl groups, alkyl groups containing up to 5 carbon atoms inclusive, or alkoxy groups containing up to 5 carbon atoms inclusive.

The nomenclature used herein is in accord with the Rules of the International Union of Pure and Applied Chemistry.

The compounds of the present invention are new and possess valuable pharmacological and therapeutic properties. They possess, more especially, musculotropic-spasmolytic properties in respect of intestinal and bronchial spasms; they exhibit adrenolytic, anticholinergic and antihistaminic properties, and are serotonin antagonists.

The present invention also provides a process for preparing the above-mentioned compounds which comprises condensing a derivative of the general Formula IV

R—X      (IV)

in which
R represents a group of the general Formula II or III in which Y, Z, $R_1$, $R_2$, $R_3$ and Ar have the meanings defined above, and X is a chlorine or a bromine atom or an aryl ester residue of a benzenesulphonic or para-toluenesulphonic acid, with the diazabicyclobenzodecane of the Formula V.

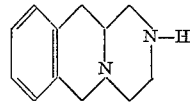

(V)

The present process is most advantageously performed by reacting a compound of the Formula IV with a diaza-bicyclobenzodecane of the Formula V dissolved in a polar solvent, for example, a low-boiling alcohol, for example, ethanol or butanol, or in a tertiary aliphatic amide, for example, dimethylformamide or dimethylacetamide. The reaction is advantageously performed at a temperature within the range of 80° C. to 140° C. in the presence of a substance capable of combining with the hydrohalic or aryl-sulphonic acid formed during the reaction. Examples of acid acceptors, which may be used, are alkali or alkaline earth metal salts of carbonic acid, for example, sodium bicarbonate or potassium or calcium carbonate, or suitable tertiary organic bases, for example, triethylamine, pyridine and N,N-dimethylaniline. Instead of the said salts or tertiary bases, there may be used an excess of the diaza-bicyclo-benzodecane of the Formula V. This latter method of carrying out the reaction is advantageously used when, in the compound of the Formula IV to be used in the condensation, X represents a sulphonic acid ester residue. In this case the excess of diaza-bicyclo-benzodecane acts as the solvent, though, if desired, the reaction may be performed in the presence of any one of the afore-mentioned solvents. This method of carrying out the present process is, however, not restricted to sulphonic acid esters and may equally well be used in cases where X represents a halogen atom.

Moreover, when the final product being prepared is one of the above general formula in which R represents a group of the general Formula II in which at least one of the substituents of the phenyl nucleus Ar is a hydroxyl group, it is preferable to carry out the condensation with a compound in which the hydrogen of the phenolic group is substituted by an acetyl or benzyl residue, instead of with the phenolic compound of the Formula II. The condensation product is then advantageously subjected to hydrolysis using a strong base or acid, or to hydrogenolysis in the presence of a catalyst, for example palladium carbon, by any one of the known methods generally employed for liberating a phenolic function from its protective groups.

The new diaza-bicyclobenzodecane compounds, which are weak bases, obtained by this method, can be converted into acid addition salts with acids, and such salts are also included in this invention. These addition salts are obtained by reacting a compound of the present invention with the approriate acid in a suitable solvent, for example, water or a water-miscible alcohol. From among the mineral acids, the following may be mentioned as suitable for the formation of acid addition salts: hydrochloric, hydrobromic, methanesulphonic, sulphuric and phosphoric acid. Suitable organic acids are acetic, propionic, maleic, fumaric, tartaric, citric, oxalic and benzoic acid.

If desired, the compounds of the invention may be purified by physical methods, for example, distillation, crystallisation or chromatography, or by chemical routes, for example, formation of one of the said acid addition salts, crystallization of the salt and decomposition with alkaline reagents.

These new compounds and their addition salts possess valuable pharmacological and therapeutic properties and may be used as medicaments acting especially on the smooth fibre of the gastrointestinal, genito urinary, respiratory and cardiovascular apparatus, and on the autonomic nervous system.

Their toxicity was studied by oral and intraperitoneal administration in mice. The median lethal dose (MLD) varies from 100 to 400 mg./kg. administered intraperitoneally and from 600 to >2000 mg./kg. administered orally.

The pharmacological activity of the new compounds was studied in vitro on the isolated organis. It was found that, at very low concentrations, the compounds tested were able to antagonise the action of acetyl choline and histamine on the guinea pig's ileum, the spasm provoked by barium chloride on the rat's duodenum, and also the activity of adrenalin on the rat's seminal vesicle.

A strong antiserotonin action in vivo was also noted by the inhibition of the plantar oedema of the rat's paw induced by serotonin.

These pharmacological properties and the low toxicity of these new diazabicyclobenzodecanes enable their use in human or animal therapy, especially in the treatment of various diseases or syndromes in which the use of medicaments exhibiting a parasympathicolytic, antichlolinergic, antispasmodic or antiserotonin activity are indicated such, for example, as intestinal spasms, gastroduodenal ulcers, nephrolithiasis and cholelithiasis, angiospasm, dysmenorrhea and migraine. Animals treated may be mice, rats, dogs, cats, horses, pigs, guinea pigs, cows, monkeys, apes, baboons, and other domestic, farm and zoo animals, as well as other test animals.

The compounds of the invention may be administered in a variety of different pharmaceutical forms, and the invention also provides pharmaceutical preparations which comprise a diazabicyclo - (4,4,0) - benzo-(1,2,h) decane compound of the above general Formula I, or a physiologically tolerable salt thereof, in admixture or conjunction with a pharmaceutically suitable solid or liquid carrier such, for example, as distilled water, glucose, lactose, talc, gum arabic or magnesium stearate.

The doses used may vary from 10 to 200 mg. in oral, rectal or parenteral administration.

The following examples illustrate the invention, but are not to be construed as limiting. The melting points are determined on a Kofler heater under the microscope in the case of the addition salts and with the use of a Kofler block in the case of the bases.

EXAMPLE 1

4-benzhydryl-1,4-diazabicyclo (4,4,0) benzo (1,2,h) decane

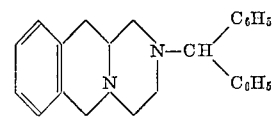

A mixture of 4.8 g. of diaza-1,4-bicyclo (4,4,0) benzo (1,2,h) decane, 6.27 g. of benzhydrylbromide, 130 cc. of dimethylformamide and 7 g. of anhydrous potassium carbonate is heated for 6 hours at a temperature of 135° C., after which the salt is filtered off and the solvent evaporated under vacuum. The crystalline residue is treated with 100 cc. of water and recrystallized from 85 cc. of ethanol, to yield 5 g. of white crystals of 4-benzhydryl-1,4-diazabicyclo (4,4,0) benzo (1,2,h) decane melting at 160° C. The starting 1,4-diazabicyclo (4,4,0) benzo (1,2,h) decane, M.P. 85–90° C., is described by Sullivan and Day in J. Org. Chem. 29 (2), 326 (1964).

EXAMPLE 2

4-(3',3'-diphenylpropyl)-1,4-diazabicyclo (4,4,0) benzo (1,2,h) decane

When the process described in Example 1 is performed with 3,3-diphenyl-1-bromopropane, there are obtained crystals of 4-(3',3'-diphenylpropyl) - 1,4 - diazabicyclo (4,4,0) benzo (1,2,h) decane melting at 131° C. in a yield of 54%.

EXAMPLE 3

4-(3',4'-methylenedioxybenzyl)-1,4-diazabicyclo (4,4,0) benzo (1,2,h) decane

When the process described in Example 1 is performed with 3,4-methylenedioxybenzyl chloride, an oily product of 4-(3',4'-methylenedioxybenzyl) - 1,4 - diazabicyclo (4,4,0) benzo (1,2,h) decane boiling at a temperature within the range of from 215° C. to 217° under 0.5 mm. Hg pressure is obtained in a yield of 89%. Its dihydrochloride, prepared with ethanol, melts and decomposes at a temperature within the range of from 195° C. to 205° C.

EXAMPLE 4

4-(3',4'-ethylenedioxybenzyl)-1,4-diazabicyclo (4,4,0) benzo (1,2,h) decane

When the process described in Example 1 is performed with 3,4-ethylene-dioxy-benzyl chloride, the dihydrochloride of 4-(3',4'-ethylenedioxybenzyl) - 1,4 - diazabicyclo (4,4,0) benzo (1,2,h) decane, which melts at a temperature within the range of from 208° C. to 212° C. with decomposition, is obtained from methanol in a yield of 60%.

EXAMPLE 5

4-(3',4'-dimethoxy benzyl)-1,4-diazabicyclo (4,4,0) benzo (1,2,h) decane

When the process described in Example 1 is performed with 3,4-dimethoxy-benzyl chloride, the dihydrochloride of 4-(3',4'-dimethoxy benzyl)-1,4-diazabicyclo (4,4,0) benzo (1,2,h) decane, which melts at a temperature with-

EXAMPLE 6

4-(4'-chlorobenzhydryl)-1,4-diazabicyclo (4,4,0) benzo (1,2,h) decane

When the process described in Example 1 is performed with 4-chlorobenzhydryl chloride (boiling at a temperature of 131° C. under 0.6 mm. Hg pressure), the crystalline base of 4-(4'-chlorobenzhydryl)-1,4-diazabicyclo (4,4,0) benzo (1,2,h) decane, melting at a temperature within the range of from 213° C. to 215° C., is obtained in a yield of 10%.

EXAMPLE 7

4-(2'-methoxybenzhydryl)-1,4-diazabicyclo (4,4,0) benzo (1,2,h) decane

When the process described in Example 1 is performed with 2'-methoxy-benzhydryl chloride (melting at a temperature within the range of from 53° C. to 55° C.), and the potassium carbonate is replaced by triethylamine, the crystalline base of 4-(2'-methoxybenzhydryl)-1,4-diazabicyclo (4,4,0) benzo (1,2,h) decane, melting at a temperature of 197° C., is obtained in a yield of 5%.

EXAMPLE 8

4-cinnamyl-1,4-diazabicyclo (4,4,0) benzo (1,2,h) decane

When the process described in Example 1 is performed with cinnamyl chloride, the dihydrochloride of 4-cinnamyl-1,4-diazabicyclo (4,4,0) benzo (1,2,h) decane is obtained, melting at 175–196° C. (anhydrous ethanol) in a yield of 41.6%.

EXAMPLE 9

4-(2'-phenylethyl)-1,4-diazabicyclo (4,4,0) benzo (1,2,h) decane

When the process described in Example 1 is performed with 2-phenylethyl bromide, the 4-(2'-phenylethyl)-1,4-diazabicyclo (4,4,0) benzo (1,2,h) decane, melting at 92° C. (heptane), is obtained in a yield of 60.6%.

EXAMPLE 10

4-(phenyl cyclohexyl methyl)-1,4-diazabicyclo (4,4,0) benzo (1,2,h) decane

When the process described in Example 1 is performed with phenyl cyclohexyl methyl chloride, the 4-(phenyl cyclohexyl methyl)-1,4 diazabicyclo (4,4,0) benzo (1,2,h) decane, melting at 128–130° C. (anhydrous isopropanol) is obtained, in a yield of 7%.

EXAMPLE 11

4-(3'-hydroxy-3',3'-diphenylpropyl)-1,4-diazabicyclo (4,4,0) benzo (1,2,h) decane When the process described in Example 1 is performed with 3-hydroxy-3,3 diphenylpropyl chloride, the 4-(3'-hydroxy-3',3'-diphenylpropyl)-1,4 - diazabicyclo (4,4,0) benzo (1,2,h) decane, melting at 83° C. (ethanol) is obtained, in a yield of 40.6%.

EXAMPLE 12

4-(2'-hydroxy-2',2'-diphenylethyl)-1,4-diazabicyclo (4,4,0) benzo (1,2,h) decane A solution of 7.53 g. of 1,4-diazabicyclo (4,4,0) benzo (1,2,h) decane and 10 g. of 1,1-diphenyl-2-chloro-1-ethanol in 75 cc. of ethanol is heated in the presence of 6.7 g. of sodium bicarbonate for 15 hours under reflux at a temperature of 80° C. The salt is then filtered off and the solvent evaporated under vacuum. The residue is recrystallized from 130 cc. of ethanol, to yield, finally, 7 g. of 4-(2'-hydroxy-2',2'-diphenylethyl)-1,4-diazabicyclo (4,4,0) benzo (1,2,h) decane, melting at a temperature of 144° C.

EXAMPLE 13

4-(3'-trifluoromethylbenzhydryl)-1,4-diazabicyclo (4,4,0) benzo (1,2,h) decane

A solution of 15.4 g. of 1,4-diazabicyclo (4,4,0) benzo (1,2,h) decane and 10.8 g. of 3-trifluoromethyl-benzhydryl chloride in 15 cc. of dimethylformamide is heated for 7 hours at a temperature of 135° C., after which period the crystalline mixture is treated with 150 cc. of water and 300 cc. of chloroform. The organic phase is decanted and dried over potassium carbonate, and the solvent is evaporated under vacuum. The semicrystalline residue is recrystallized from 65 cc. of ethanol, to yield 7.2 g. of a crystalline base of 4-(3'-trifluoromethylbenzhydryl)-1,4-diazabicyclo (4,4,0) benzo (1,2,h) decane melting at a temperature within the range of from 125° C. to 128° C.

EXAMPLE 14

4-(4'-hydroxy-3'-methoxybenzyl)-1,4-diazabicyclo (4,4,0) benzo (1,2,h) decane

The process described in Example 1 is performed with (3-methoxy-4-acetoxy)-benzyl chloride (boiling at a temperature within the range of from 128° C. to 130° C. under 1 mm. Hg pressure) to give an 80% yield of 4-(4'-acetoxy-3'-methoxybenzyl) - 1,4 - diazabicyclo (4,4,0) benzo (1,2,h) decane in the form of a dark brown oil, which is hydrolysed by heating under reflux for 9 hours in a solution of potassium hydroxide in 95% ethanol under nitrogen.

The solvent is evaporated under vacuum and the residue treated with water, and the resulting crystalline product is recrystallized from isopropanol. Yield: 44.7% of a crystalline base of 4-(4'-hydroxy-3'-methoxybenzyl)-1,4-diazabicyclo (4,4,0) benzo (1,2,h) decane, melting at a temperature of 161° C.

EXAMPLE 15

4-(3',3',3'-triphenylpropyl)-1,4-diazabicyclo (4,4,0) benzo (1,2,h) decane

A mixture of 18.8 g. of 1,4-diazabicyclo (4,4,0) benzo (1,2,h) decane and 14.6 g. of 3,3,3-triphenylpropyltosylate (melting at a temperature of 118° C.) is heated for 6 hours at a temperature of 130° C., after which period the resulting viscous residue is treated with 100 cc. of water and 250 cc. of chloroform. The organic phase is decanted and dried over potassium carbonate and the solvent evaporated under vacuum. The resulting semicrystalline residue is recrystallized from 150 cc. of ethanol, to yield 7.1 g. of 4-(3',3',3'-triphenylpropyl)-1,4-diazabicyclo (4,4,0) benzo (1,2,h) decane, melting at a temperature within the range of from 173° C. to 174° C.

EXAMPLE 16

4-(3',3',3'-triphenyl-2'-methylpropyl)-1,4-diazabicyclo (4,4,0) benzo (1,2,h) decane When the process described in Example 15 is performed with 3,3,3-triphenyl-2-methylpropyl tosylate, the 4-(3',3',3' - triphenyl-2'-methylpropyl) - 1,4 - diazabicyclo (4,4,0) benzo (1,2,h) decane, melting at 187–193° C. (anhydrous methanol) is obtained, in a yield of 14.6%.

EXAMPLE 17

4 - (3', 3' - diphenyl - 2' - methylpropyl) - 1, 4 - diazabicyclo (4,4,0) benzo (1,2,h) decane When the process described in Example 15 is performed with 3,3-diphenyl-2-methylpropyl tosylate, the 4-(3',3'-diphenyl-2'-methylpropyl)-1,4-diazabicyclo (4,4,0) benzo (1,2,h) decane, melting at 148° C. (heptane), is obtained in a yield of 6.4%.

EXAMPLE 18

4 - (4', 4' - diphenylbut - 1' - yl) - 1, 4 - diazabicyclo (4,4,0) benzo (1,2,h) decane When the process described in Example 15 is performed with 4,4-diphenyl butyl tosylate, the 4-(4',4'-diphenylbut-1'-yl)-1,4-diazabicyclo (4,4,0) benzo (1,2,h) decane, melting at 172–185° C. (methanol), is obtained, in a yield of 43.2%.

EXAMPLE 19

4 - (5', 5' - diphenylpent - 1' - yl) - 1, 4 - diazabicyclo (4,4,0) benzo (1,2,h) decane When the process described in Example 15 is performed with 5,5-diphenylpentyl tosylate, the 4-(5',5'-diphenyl-pent-1'-yl)-1,4-diazabicyclo (4,4,0) benzo (1,2,h) decane, melting at 107° C. (anhydrous ethanol), is obtained, in a yield of 56.9%.

EXAMPLE 20

4 - (2' - p - chlorophenylethyl) - 1, 4 - diazabicyclo (4,4,0) benzo (1,2,h) decane When the process described in Example 1 is performed with 2-(p-chlorophenyl)ethyl bromide, the 4-(2'-p-chlorophenylethyl)-1,4-diazabicyclo (4,4,0) benzo (1,2,h) decane is obtained.

EXAMPLE 21

4 - (2' - p - tolylethyl) - 1, 4 - diazabicyclo (4,4,0) benzo (1,2,h) decane

When the process described in Example 1 is performed with 2-(p-tolyl)ethyl chloride, the 4-(2'-p-tolylethyl)-1, 4-diazabicyclo (4,4,0) benzo (1,2,h) decane is obtained.

EXAMPLE 22

4-(3'-p-trifluoromethylphenylpropyl)-1,4diazabicylo (4,4,0) benzo (1,2,h) decane When the process described in Example 1 is performed with 3-(p-trifluoromethylphenyl)propyl chloride, the 4-(3' - p - trifluoromethylphenylpropyl)-1,4-diazabicyclo (4,4,0)benzo (1,2,h) decane is obtained.

EXAMPLE 23

4 - [3', 3' - di-(p-tolyl)-2'-methylpropyl]-1,4-diazabicyclo (4,4,0) benzo (1,2,h) decane When the process described in Example 15 is performed with 3,3-di-(p-tolyl)-2-methlpropyl tosylate, the 4-[3',3'-di - (p-tolyl)-2'-methylpropyl]-1,4-diazabicyclo (4,4,0) benzo (1,2,h) decane is obtained.

Where the foregoing examples produce a compound having a methyl or other lower-alkyl group, it is to be understood that compounds containing other lower-alkyl groups of straight or branched nature, such as methyl, ethyl, propyl, isopropyl, butyl, sec.-butyl, t.-butyl, amyl, and isoamyl, are prepared in the same manner by substitution in the process of the appropriate different lower-alkyl starting material. Likewise, where chloro or other halogen atom is present, although chlorine is preferred, further halogen compounds including iodo, bromo, chloro, and fluoro compounds are prepared starting from the appropriate halogenated starting material. Similarly, where methoxy or other lower-alkoxy group is present, compounds having other lower-alkoxy groups containing various lower-alkyl groups are prepared in the same manner from the appropriate different lower-alkoxy starting material. In the same manner, ortho or meta products are produced instead of the para by utilizing the selected ortho or meta substituted starting material, and vice versa. Similarly, other molecular changes within the scope of the invention are readily made.

We claim:
1. A compound selected from the group consisting of (A) 1,4-diazabicyclo (4,4,0) benzo (1,2,h) decane compounds of the Formula I:

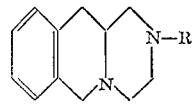

(I)

wherein R is a substituent selected from the group consisting of (1)  —Y—Ar wherein:

Y is selected from the group consisting of (a) a linear polymethylene chain —$(CH_2)_n$—, in which $n$ is 1 to 4 inclusive, (b) such a linear chain having at least 2 carbon atoms, having an ethylenic double bond, and (c) a branched polymethylene chain having 2 to 4 carbon atoms inclusive, Ar is selected from the group consisting of halophenyl, trifluoromethylphenyl, lower-alkylphenyl, hydroxyphenyl, lower-alkoxy-phenyl, methylene dioxyphenyl and ethylene-dioxyphenyl and, when $n$ is other than 1, also phenyl, and (2)

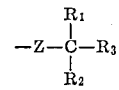

wherein

Z is selected from the group consisting of (a) a linear polymethylene chain —$(CH_2)_p$—, in which $p$ is 0 to 4 inclusive, and (b) a branched polymethylene chain having 2 to 4 carbon atoms inclusive, $R_1$ is selected from the group consisting of hydrogen, hydroxy, and phenyl, $R_2$ is selected from the group consisting of phenyl, cyclohexyl, and lower-alkylphenyl, $R_3$ is selected from the group consisting of phenyl, halophenyl, trifluoromethylphenyl, lower - alkylphenyl and lower-alkoxyphenyl, lower-alkyl and lower-alkoxy in the foregoing having up to 5 carbon atoms, inclusive. and (B) physiologically acceptable addition salts thereof with organic and mineral acids.

2. A compound of claim 1 which is 4-benzhydryl-1,4-diazabicyclo (4,4,0) benzo (1,2,h) decane.

3. A compound of claim 1 which is 4-(3',3'-diphenyl-propyl)-1,4-diazabicyclo (4,4,0) benzo (1,2,h) decane.

4. A compound of claim 1 which is 4-(3',4'-ethylene-dioxybenzyl - 1,4 - diazabicyclo (4,4,0) benzo (1,2,h) decane.

5. A compound of claim 1 which is 4-(phenylcyclohexyl methyl)-1,4-diazabicyclo (4,4,0) benzo (1,2,h) decane.

6. A compound of claim 1 which is 4-(2'-hydroxy-2',2'-diphenylethyl) - 1,4 - diazabicyclo (4,4,0) benzo (1,2,h) decane.

7. A compound of claim 1 which is 4-(3',3',3'-triphenylpropyl)-1,4-diazabicyclo (4,4,0) benzo (1,2,h) decane.

References Cited
UNITED STATES PATENTS

| | | | |
|---|---|---|---|
| 2,965,641 | 12/1960 | Krimmel | 260—268 |
| 3,164,598 | 1/1965 | Freed | 260—268 |
| 3,176,017 | 3/1965 | Freed | 260—268 |
| 3,281,419 | 10/1966 | Doebel | 260—268 X |
| 3,388,128 | 6/1968 | Day et al. | 260—268 |

DONALD G. DAUS, Primary Examiner

U.S. Cl. X.R.

260—649, 346.2, 345.2, 618, 456; 424—258

UNITED STATES PATENT OFFICE
CERTIFICATE OF CORRECTION

Patent No. __3,517,012__        Dated __June 23, 1970__

Inventor(s) __Gilbert Regnier et al.__

It is certified that error appears in the above-identified patent and that said Letters Patent are hereby corrected as shown below:

Column 5, line 59             "83°"     should read

Application Page 8, line 29     --- 183° ---

SIGNED AND SEALED
NOV 24 1970

(SEAL)
Attest:

Edward M. Fletcher, Jr.
Attesting Officer

WILLIAM E. SCHUYLER, JR.
Commissioner of Patents